United States Patent [19]
Burr et al.

[11] 3,823,342
[45] July 9, 1974

[54] VOLTAGE PROTECTION CIRCUITRY FOR DIRECT CURRENT POWERED MACHINERY

[75] Inventors: John F. Burr, Pittsburgh, Pa.; Gary L. Powell, Fairmont, W. Va.

[73] Assignee: Consolidation Coal Company, Pittsburgh, Pa.

[22] Filed: June 25, 1973

[21] Appl. No.: 373,130

[52] U.S. Cl. ................ 317/13 R, 317/18 A, 317/44
[51] Int. Cl. ............................................. H02h 7/09
[58] Field of Search ......... 317/18 A, 18 C, 44, 13 R

[56] References Cited
UNITED STATES PATENTS
3,171,062   2/1965   Rowe ............................... 317/18 A
3,665,251   5/1972   Buckeridge ...................... 317/18 A Primary Examiner—James D. Trammell
Attorney, Agent, or Firm—Stanley J. Price, Jr.

[57] ABSTRACT

A diode and a current limiting resistor are serially connected between a grounded electrical conductor and the frame portion of an electrically operable machine supplied with direct current power from a remote power source through trailing conductors connected to the machine load. The diode is operable to prevent the frame from being raised to the full-line voltage of the power source in the event the polarity of the conductors is reversed. The current limiting resistor limits the flow of current, caused by transient voltages appearing on the frame, to an intrinsically safe level. A capacitor and a plurality of resistors arranged in parallel circuit relation with the current limiting resistor monitor the existence of a fault voltage appearing thereacross. When the capacitor receives a charge of a predetermined magnitude, a diac serially connected to the capacitor conducts current therethrough to the gate terminal of a first silicon controlled rectifier. The first silicon controlled rectifier switched to a conductive state provides a direct path for the flow of current from the frame to the grounded conductor. A second silicon controlled rectifier, switched to a conductive state upon actuation of the first silicon controlled rectifier, deenergizes a relay to thereby terminate operation of the machine and signal the condition of fault voltage applied to the frame.

9 Claims, 1 Drawing Figure

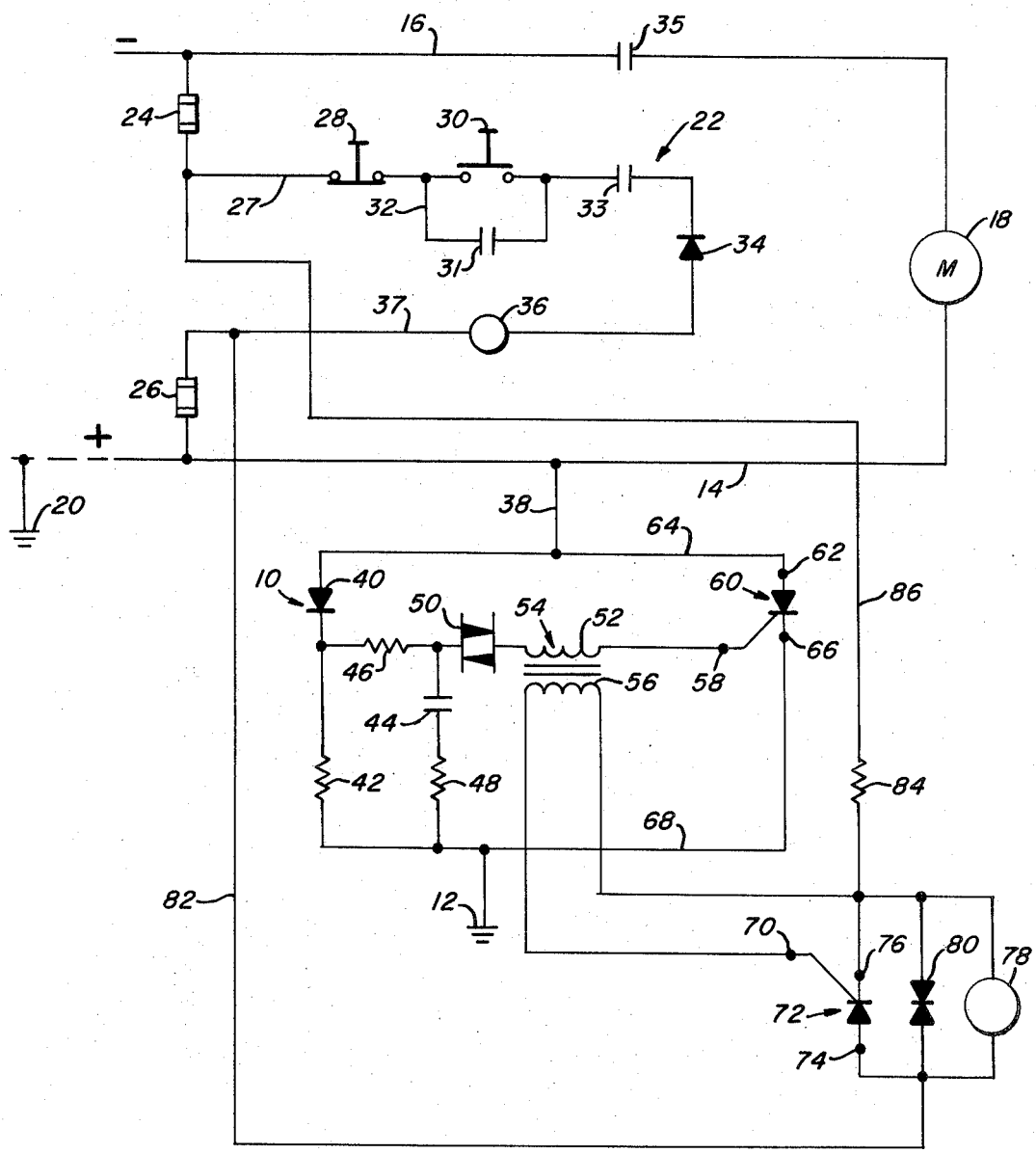

VOLTAGE PROTECTION CIRCUITRY FOR DIRECT CURRENT POWERED MACHINERY

BACKGROUND OF THE INVENTION

1. Field of the Invention

This invention relates to voltage protection circuitry for electrically operable machinery supplied with direct current power, and more particularly to voltage protection circuitry that senses the grounding of the machine frame when an undesirable voltage, exceeding a predetermined magnitude, is applied to the frame and provides a signal indicating the undesirable voltage condition.

2. Description of the Prior Art

Transient voltages applied to the frame of electrically powered machinery, particularly direct current and alternating current powered mining machines, create a hazardous working environment which may result in electric shock to operating personnel or the occurrence of fire initiated by a spark. For mobile machines supplied with continuous power through a trailing cable from the power source to the machine, wear and excessive flexing of the cable can destroy the continuity of the ground connection between the machine frame and ground at the power source. Destruction of the ground conductor opens the ground circuit which can permit a fault voltage to appear on the frame. Thus, when the frame of a machine carrying a fault voltage comes in contact with a grounded machine or a grounded workman, current flows from the ungrounded machine to the grounded connection. In the case of a workman, a severe electrical shock may be inflicted as a result. With the grounded electrically powered machine, the arcing and sparking between frames may have sufficient electrical energy to ignite a combustible mixture of methane and air in a gaseous mine. Tests conducted by the United States Bureau of Mines conclude that the maximum level of electrical energy that can exist between any two machine frames, where one frame carries a fault voltage, is that amount of voltage which is necessary to produce 1 ampere of current measured across a 0.1 ohm resistor connected between the frames. Voltage at this magnitude would ignite the most combustible mixture of methane and air found in a mine.

Transient voltages may also appear as the result of induced current flowing through the insulated grounding conductors of a multi-conductor cable supplying alternating current power to electrically operable mining machinery. Upon contact with a grounded machine, the induced voltage in the cable could produce a spark and a resultant fire. In a similar manner, induced transient voltages resulting from broken ground wires and stray D.C. currents can create a hazardous condition if permitted to remain uncorrected in a mine.

The operation of a diode grounded, twin reel mine shuttle car, having two trailing cables which may be extended a considerable distance from the shuttle car to the power source, creates hazardous conditions as the result of undesirable voltages appearing on the machine frame. The portions of cables wound about the twin reels are comparable to large inductors which tend to resist a change in the status of the current flow through the inductor. The magnetic field generated by the changing flow of current to the wound cables induces a transient voltage that attempts to resist a current increase supplied to the machine load. For a positive grounded shuttle car, a negative charge is applied to the machine side of the reel when current is supplied to the machine load. However, the diode operates to block the flow of induced current to the frame when current is being supplied to the machine load. On the other hand, a decrease in current flow to the machine load produces a magnetic field collapse around the wound cables creating an induced voltage that tends to maintain the current. Consequently, the frame receives a positive charge. The diode is unable to block the flow of induced current to the frame when the current supply is diminished. As a result, a hazardous condition has developed by the presence of the induced voltage on the machine frame.

The use of electrical circuits utilizing relays, contacts, switches, semiconductor elements, such as diodes and silicon controlled rectifiers, and other electrical devices to monitor and control a given voltage condition are well known in the art. U.S. Pats. Nos. 3,305,755; 3,317,792; 3,436,639; 3,475,653; 3,454,860 and 3,573,550 disclose circuit arrangements for actuating a silicon controlled rectifier in response to an undesirable voltage condition. The voltage across a reference resistor in the circuit is suitably monitored. If the voltage across the reference resistor exceeds a predetermined magnitude, a signal voltage is delivered to the gate terminal of the silicon controlled rectifier. The silicon controlled rectifier is then switched to a conductive state and thereby supplies current flow to accomplish a desired task, such as opening or closing a contact, charging a battery, cutting off the supply of current to a battery, energizing or deenergizing a relay, activating an alarm or protecting circuit components from an abnormal circuit condition.

U.S. Pat. Nos. 3,196,316 and 3,522,479 provide protective electrical systems for continuously monitoring the integrity of a ground conductor and detecting a ground fault in a phase conductor for mobile mining machines supplied with alternating current power from a multi-conductor cable connecting the machine load to a remote power source. The protective circuit is connected between the power source and the ground wire. In the event the continuity of the ground wire is destroyed, the protective circuit energizes a circuit breaking means to remotely cut off the power supplied to the machine load to activate an alarm signaling the presence of a fault.

U.S. Pat. No. 2,637,843 discloses an electrical protective system for use with heavy duty mining equipment and electrical cables operating on direct current. This system functions to prevent damage to the equipment and to the cables upon the occurrence of an abnormal voltage condition such as a ground fault. If a ground fault should occur in the ground conductor, a first solenoid coil is energized to open a switch to thereby deenergize a second solenoid coil which, in turn, opens a switch so that the current is interrupted from the positive conductor to the mining equipment. In this manner, the system detects a ground fault and cuts off the direct current power supply in response to the detection of the ground fault. The system, however, requires a three conductor cable extended from the remote power source to the equipment, and no means are provided to ground the equipment upon the detection of a ground fault.

There is need to provide voltage protection circuitry for electrically operable machinery supplied with direct current power by two conductor cables extending from a remotely located power source. The voltage protection circuitry should provide a signal device that indicates the existence of an undesirable voltage condition applied to the machine frame by interrupting supply of power to the machine load to thereby terminate operation of the machine. If a transient voltage appears on the machine frame, the voltage protection circuitry should limit current flow to an intrinsically safe level. If the voltage still exists after a time delay, a conductive path should be provided from the frame to the grounded electrical conductor, thereby grounding the frame. With the frame grounded, the voltage protection circuitry should actuate a signal which terminates operation of the machine and alerts the operator to the existence of the undesirable voltage condition.

SUMMARY OF THE INVENTION

This invention relates to voltage protection circuitry for electrically operable machinery supplied with direct current power and having a frame portion and an electrically operable load having one polarity connected to ground. Conducting means having a ground connection supplies direct current power to the electrically operable load. A current limiting device is serially connected between the conducting means and the frame. The current limiting device is operable to limit the flow of current, caused by a transient voltage, through the frame to a predetermined magnitude. A voltage protection device, serially connected between the current limiting device and the conducting means, prevents the frame from being charged to the full magnitude of the direct current power supplied to the load. Grounding means is provided to direct the flow of fault voltage current applied to the frame to the conducting means connected to ground. A sensing device, serially connected between the voltage protection device and the grounding means, monitors the actuation of the grounding means to ground the frame. A signal device is provided to indicate the condition of fault voltage current applied to the frame. The signal device is coupled to the sensing means and connected in a parallel circuit with the conducting means. Current passing through the sensing means actuates the signal device to thereby terminate the supply of direct current power to the load.

The grounding means includes a first silicon controlled rectifier having a gate terminal connected to a normally nonconductive diac. When a fault voltage appears on the frame, a capacitor connected in parallel circuit relation across the current limiting device charges to the full magnitude of the fault voltage after a time delay determined by a plurality of resistors connected in series with the capacitor. When the charge applied to the capacitor reaches a predetermined magnitude, the breakdown voltage of the diac will be exceeded. The diac then conducts to supply current flow to the gate terminal of the first silicon controlled rectifier. The silicon controlled rectifier, in turn, becomes conductive to direct the flow of fault voltage current from the frame to the ground connection of the conducting means.

The sensing device comprises a pulse transformer having primary and secondary windings. The primary winding is connected in series between the diac and the gate terminal of the first silicon controlled rectifier. When current flows through the primary winding, the secondary winding is energized and supplies current flow to the signal device which includes a second silicon controlled rectifier. Flow of current from the secondary winding to the gate terminal of a second silicon controlled rectifier switches the second silicon controlled rectifier to a conductive state so that current is directed therethrough to deenergize a relay. Deenergizing the relay opens a contact associated therewith.

Opening the contact interrupts the flow of current to a contactor and thereby deenergizes the contactor. Deenergizing the contactor functions to open a contact connected to the conducting means and in series circuit with the load. Opening the contact interrupts the direct current power supplied to the load by the conducting means.

Accordingly, the principle object of this invention is to provide voltage protection circuitry which actuates a signal for indicating the condition of fault voltage current applied to the frame of an electrically operable machine.

Another object of this invention is to provide voltage protection circuitry for grounding the frame of an electrically operable machine when a fault voltage of a predetermined magnitude is applied to the frame.

Still another object of this invention is to provide voltage protection circuitry for monitoring grounding of an electrically operable machine upon application of a fault voltage to the machine frame.

A further object of this invention is to provide a signal for the operator of an electrically operable machine alerting him to the existence of a fault voltage applied to the machine frame by actuating a silicon controlled rectifier within a voltage protection circuit to thereby terminate operation of the machine, sound an audible alarm or initiate a visual alarm.

These and other objects of this invention will be more completely disclosed and described in the following specification, the accompanying drawing and the appended claims.

BRIEF DESCRIPTION OF THE DRAWING

The drawing is a schematic diagram illustrating the voltage protection circuitry provided the ground conductor and frame portion of a direct current powered machine according to the present invention.

DESCRIPTION OF THE PREFERRED EMBODIMENTS

Referring to the schematic diagram there is illustrated a voltage protection circuit generally designated by the numeral 10 provided to monitor the presence of voltage appearing between the frame 12 of the direct current powered machine, such as a conventional twin cable reel mine shuttle car, and the ground trailing conductor 14. Reference to practice of the present invention in combination with mine shuttle cars is made for exemplary purposes only and is not intended to constitute a limitation on the application of the invention. The present invention is adaptable for use with direct current powered machinery supplied with a ground connection from the power source. A high voltage source (not shown) supplies direct current power through the negative trailing conductor 16 to the machine load, such as the direct current motor 18 mounted on a shuttle car. The motor 18 is grounded by the positive ground conductor 14 at the ground 20. In the illustrated embodiment of the present invention, the positive polarity of the power source is grounded, however, the system may be designed for negative grounding as well.

The electrical conductors 14 and 16 are connected to the control circuit generally designated by the numeral 22 through the dual fuses 24 and 26. The control circuit 22 includes the conductor 27 connecting the fuse 24 with a normally closed stop switch 28 which is serially connected to a normally open start switch 30. A normally open contact 31 is provided in the lead 32 connected across the contacts of the start switch 30. The contact 33 closed for operation of the motor 18, the diode 34 and the contactor 36 complete the control circuit 22. A normally open contact 35, also associated with the contactor 36, is connected to conductor 16 between the fuse 24 and the motor 18. The conductor 37 connects the anode of the diode 34 with the fuse 26.

The positive ground conductor 14 is connected by the conductor 38 through the diode 40 and the current limiting resistor 42 of circuit 10 to the machine frame 12. A capacitor 44 is connected across the resistor 42 between the resistors 46 and 48 which comprise a time delay circuit for charging the capacitor 38. A diac 50 is provided in series circuit relation with the capacitor 44. The primary winding 52 of a pulse transformer, generally designated by the numeral 54, having a secondary winding 56 is connected in series between the diac 50 and the gate terminal 58 of the silicon controlled rectifier generally designated by the numeral 60. The silicon controlled rectifier 60 includes an anode 62 which is connected to the conductor 38 by the conductor 64 completing the first branch of the voltage protection circuit 10 provided between the frame 12 and the ground conductor 14. The cathode 66 of the silicon controlled rectifier 60 is connected to the frame 12 through the conductor 68, thus completing the second branch of the voltage protection circuit 10 provided between the frame 12 and the ground conductor 14.

The secondary winding 56 of the pulse transformer 54 is coupled to the gate terminal 70 of the silicon controlled rectifier generally designated by the numeral 72. The silicon controlled rectifier 72 having an anode 74 and a cathode 76 is positioned in parallel circuit relation with the normally energized relay 78 and the bidirectional thyristor 80. The anode 74 is connected to the conductor 37 of the control circuit 22 through the conductor 82; while, the cathode 76 is arranged in series circuit relation with the resistor 84 connected, in turn, to the conductor 27 of the control circuit 22.

As illustrated in the schematic diagram, operation of the motor 18 is terminated as long as the contacts of the start switch 30 in the control circuit 22 remain open. With the start switch 30 maintained in open position, the flow of current to the motor 18 is blocked by the open contact 35 in the conductor 16. The operator activates the motor 18 by closing the contacts of the start switch 30. Current then flows through the closed contact 33 to energize the coil of the contactor 36. Once the coil of the contactor 36 is energized, the contacts 31 and 35 close and permit supply of direct current power to the motor 18 from the remote power source through the conductor 16. Closing the contact 31 provides current flow through the control circuit 22 permitting release of the start switch 30. To cease operation of the motor 18, the operator opens the normally closed contacts of the stop switch 28. Opening the stop switch 28 breaks the control circuit 22 to interrupt the flow of current to the coil of the contactor 36 and thereby deenergize the coil. Consequently, the contact 35 is opened terminating the supply of direct current power through the conductor 16 to the motor 18. The power supply to the motor 18 will remain cut off until the contacts of the start switch 30 are again closed.

In accordance with the practice of the present invention, the diode 40 connected between the positive conductor 14 and the frame 12 through the conductor 38, provides a path for the flow of current from the frame 12 to the ground conductor 14. In the event that the polarity of the positive and negative conductors 14 and 16 is reversed by inadvertently connecting the ground conductor 14 to the output terminal of the power source, the diode 40 blocks the flow of current to the frame 12. Thus, the diode 40 functions as a voltage protection device to prevent the frame 12 from being raised to the full-line voltage of the direct current power source.

An applicable to twin reel shuttle cars, a substantial length of trailing cable is available for extension from each reel supported on the shuttle car frame. The cable portions reeved about the reels constitute large inductors with varying current flowing therethrough. When direct current power is supplied to the motor 18 through the conductor 16, the portion of the conductor 16 wound about the reel functions as an inductor and tends to prevent a change in the status of the current flow, in this case an increase in the current flow. Subsequently, a transient voltage in the form of an induced voltage is applied through the cable reels to thereby make the conductor 38 more negatively charged than ground. The diode 40, however, blocks the flow of the transient voltage current to the frame 12 when the motor 18 is energized. On the other hand, when direct current power to the motor 18 is terminated, the magnetic field built up around the cable reel during the charging phase collapses to thereby apply a transient voltage of reverse polarity on the frame 12. Thus, a reduction in the current level applied to the motor 18 produces a transient voltage on the frame 12, making the conductor 38 and the frame 12 more positively charged than ground. The diode 40 will not function to block the flow of transient voltage current when a voltage of positive polarity is applied to the conductor 38. The current limiting resisitor 42, connected to the diode 40 between the conductor 14 and the frame 12, limits the current flow through the frame 12 to a predetermined magnitude. The resistor 42 limits the flow of current from the frame 12 to such an intrinsically safe level that if, for example, the frame 12 came in contact with the frame of an alternating current powered machine, the resultant arc would not have sufficient energy to ignite a combustible mixture of methane and air.

Any undesirable voltage such as a transient or fault voltage, resulting from a fault condition which appears on the frame 12, is monitored by the current limiting resistor 42 in the circuit 10. The capacitor 44 provided across the resistor 42 is charged to the full voltage level of the resistor 42. The time interval in which the capacitor 44 is charged to the full magnitude of the fault voltage applied to the frame 12 and appearing across the resistor 42 is dependent upon the magnitude of the fault voltage. Accordingly, the greater the magnitude of the fault voltage applied to the frame 12, the shorter the time interval in which the capacitor 44 is charged to the fault voltage. When the fault voltage appearing across resistor 42 and monitored by the capacitor 44 reaches a predetermined magnitude, the breakdown voltage of the diac 50 is exceeded. Consequently, the diac 50, characteristic of a bilateral semiconductive element, switches to a conductive state and thereby provides a path for current to flow to the gate terminal 58 of the silicon controlled rectifier 60. The diac 50 will conduct current in both the forward and reverse directions when the fault voltage applied across the resistor 42 exceeds the voltage breakdown level of the diac 50.

The silicon controlled rectifier 60 is normally retained in a nonconductive state in the absence of current flowing from the diac 50 to the gate terminal 58. The application of a low voltage signal at the gate terminal 58 will actuate the silicon controlled rectifier 60 to become conductive between the anode 62 and the cathode 66. The minimum applied voltage at which the silicon controlled rectifier 60 conducts current is controlled by the breakdown voltage of the diac 50. When the breakdown voltage of the diac 50 is exceeded, the diac 50 conducts and the silicon controlled rectifier 60 is triggered. Thus, the gate voltage of the silicon controlled rectifier 60 is controlled by the breakdown voltage of the diac 50 and the voltage drop across the resistor 42. By suitably selecting the resistance of the resistor 42 and the breakdown voltage of the diac 50, the gate voltage may be predetermined. Switcing the silicon controlled rectifier 60 to a conductive state provides a direct path for the flow of fault voltage current from the frame 12 through the silicon controlled rectifier 60 and the conductors 64 and 38 to the ground conductor 14.

With the above described arrangement, the hazards of an explosion attributed to intermachine arcing and electrical shock caused by fault voltages applied to the frame 12 are eliminated by grounding the frame 12. For short transient voltages which are applied to the frame 12, the breakdown voltage of the diac 50 is not exceeded and current is permitted to pass through the frame 12. Should the frame 12 come in contact with an electrically grounded machine, the arcing which would take place between the machines would have insufficient energy to ignite a combustible mixture of methane and air. Consequently, an intrinsicially safe level of undesirable voltage may be present on the frame 12 without presenting a hazardous condition.

Switching the diac 50 to a conductive state provides for the flow of current through the primary winding 52 of the pulse transformer 54. Current flow through the primary winding 52 energizes the secondary winding 56 to thereby provide current flow to the gate terminal 70 of the silicon controlled rectifier 72. The application of a low voltage signal at the gate terminal 70 actuates the silicon controlled rectifier 72 to switch to a conductive state for the passage of current from the anode 74 to the cathode 76. With this arrangement, the pulse transformer 54 functions as a sensor in which the primary winding 52 monitors actuation of the silicon controlled rectifier 60 to ground the frame 12 by energizing the secondary winding 56. Current flow from the secondary winding 56 to the gate terminal 70 triggers the second silicon controlled rectifier to conduct current from the anode 74 to the cathode 76.

In a conductive state the silicon controlled rectifier 72 appears as a short circuit across the normally energized relay 78. The circuit flow through the silicon controlled rectifier 72 deenergizes the relay 78. The thyristor 80 provided across the relay 78 is a bilateral semiconductor which becomes conductive by the application of voltage of either positive or negative polarity thereto. The thyristor 80 is operable to conduct at a voltage below the peak reverse voltage of the silicon controlled rectifier 72. Therefore, to protect the silicon controlled rectifier 72 from transient voltages of a magnitude above the peak reverse voltage thereof, the thyristor 80 becomes conductive to short circuit the silicon controlled rectifier 72. The thyristor 80 will automatically return to a nonconductive state before the relay 78 deenergizes.

Deenergizing the relay 78 connected to the control circuit 22 through the conductor 82 opens the contact 33 and interrupts the supply of direct current to the contactor 36. Thus, the coil of the contactor 36 is deenergized, and thereupon the contacts 31 and 35 open. The diode 34 prevents the reverse flow of current from the contact 33 to the contactor 36 which would otherwise energize the contactor coil. The open contact 35 interrupts the supply of direct current power through the conductor 16 to the motor 18. Operation of the motor 18 is thus terminated and to restart the motor 18 after the occurrence of a fault, power must be removed from the machine. Ceasing operation of the machine by virtue of the existence of an abnormal voltage condition appearing on the frame 12 provides the operator with a signal indicating such a condition. The operator can then take the necessary action to correct the undesirable condition by locating the fault and thereafter continue safe operation of the electrically powered machine. By modifying the control circuit 22 to include a lamp or audible alarm, the operator would be alerted to a fault condition by extinguishment of the lamp or activation of the audible alarm, as opposed to terminating operation of the machine.

With the above described electrical circuitry, it is now possible to ground electrically operable machinery supplied with direct current power when a fault voltage is applied to the machine frame. Thus, the hazard presented by fire occurring as the result of intermachine arcing and induced voltages applied to the frame are eliminated by directing the undesirable current from the machine frame to the ground conductor. Furthermore, a pulse transformer, sensing the actuation of the first silicon controlled rectifier to ground the machine frame, actuates a second silicon controlled rectifier to terminate the supply of power to the machine load and thereby prevent operation of the machine. Once the fault condition has been located and corrected, operation of the machine may be safely resumed.

According to the provisions of the patent statutes, we have explained the principle, preferred construction and mode of operation of our invention and have illustrated and described what we now consider to represent its best embodiments. However, it should be understood that, within the scope of the appended claims, the invention may be practiced otherwise than as specifically illustrated and described.

We claim:

1. In a voltage protection circuit for direct current powered machinery having conducting means for supplying direct current power to an electrically operable load with one polarity connected to ground,
    means for limiting the flow of current through the machine frame to a predetermined magnitude,
    voltage protection means for preventing said frame from being charged to the full magnitude of the direct current power supplied to said electrically operable load, and
    grounding means for directing the flow of fault voltage current applied to said frame to said conducting means connected to ground,
    the improvement comprising,
    sensing means for monitoring the actuation of said grounding means to ground said frame, said sensing means connected in a series circuit with said voltage protection means and said grounding means, and
    signal means for indicating the condition of fault voltage current applied to said frame, said signal means coupled to said sensing means and connected in a parallel circuit with said conducting means.

2. In a voltage protection circuit for direct current powered machinery, the improvement as set forth in claim 1 which includes,
    said signal means actuated by current passing through said sensing means.

3. In a voltage protection circuit for direct current powered machinery, the improvement as set forth in claim 1 which includes,
    said signal means actuated by current passing through said sensing means to thereby terminate the supply of direct current power to said load.

4. In a voltage protection circuit for direct current powered machinery, the improvement as set forth in claim 1 in which said sensing means includes,
    a pulse transformer having a primary and a secondary winding,
    said primary winding serially connected to said current limiting means and said grounding means,
    said secondary winding serially connected to said signal means.

5. In a voltage protection circuit for direct current powered machinery, the improvement as set forth in claim 4 wherein,
    said primary winding energizes said secondary winding to conduct current when current flows through said primary winding,
    said secondary winding, energized by said primary winding, actuates said signal means to indicate the condition of fault voltage current applied to said frame.

6. In a voltage protection circuit for direct current powered machinery, the improvement as set forth in claim 1 in which said signal means includes,
    means for terminating the supply of direct current power to said load when fault voltage current is applied to said frame.

7. In a voltage protection circuit for direct current powered machinery, the improvement as set forth in claim 1 in which said means for terminating the supply of direct current power to said load includes,
    a normally energized relay,
    a silicon controlled rectifier having a gate terminal connected to said sensing means and an anode and a cathode connected across said normally energized relay, and
    a normally energized contactor for controlling the flow of direct current power to said load, said contactor connected between said relay and said load.

8. In a voltage protection circuit for direct current powered machinery, the improvement as set forth in claim 7 which includes,
    said silicon controlled rectifier operable to conduct current from said anode to said cathode when voltage is applied to said gate terminal to thereby deenergize said relay and said contactor.

9. In a voltage protection circuit for direct current powered machinery, the improvement as set forth in claim 7 in which said contactor includes,
    a contact connected to said conducting means and in series circuit with said load,
    said contact opened by deenergizing said contactor to interrupt the direct current power supplied to said load by said conducting means.

* * * * *